US011185953B2

(12) United States Patent
Conde Zelocuatecatl

(10) Patent No.: US 11,185,953 B2
(45) Date of Patent: Nov. 30, 2021

(54) SERVICE PANEL FOR A COOKING APPLIANCE

(71) Applicant: Midea Group Co., Ltd., Foshan (CN)

(72) Inventor: Felix Conde Zelocuatecatl, Louisville, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 162 days.

(21) Appl. No.: 15/843,424

(22) Filed: Dec. 15, 2017

(65) Prior Publication Data
US 2019/0184506 A1 Jun. 20, 2019

(51) Int. Cl.
B23P 19/04 (2006.01)
F24C 15/08 (2006.01)
F24C 15/00 (2006.01)

(52) U.S. Cl.
CPC ............ B23P 19/04 (2013.01); F24C 15/007 (2013.01); F24C 15/08 (2013.01)

(58) Field of Classification Search
CPC ................................ B23P 19/04; F24C 15/007
See application file for complete search history.

(56) References Cited

U.S. PATENT DOCUMENTS

| 1,854,743 | A | * | 4/1932 | Jewett | F24C 15/08 126/39 B |
| 2,019,045 | A | * | 10/1935 | Chafee | F24C 15/08 126/37 R |
| 2,161,537 | A | * | 6/1939 | Stockstrom | F24C 15/08 126/39 B |
| 2,212,022 | A | | 8/1940 | Hobson | |
| 2,217,059 | A | * | 10/1940 | Klute | F24C 15/08 126/1 R |
| 2,258,489 | A | * | 10/1941 | Grindle | F24C 15/08 220/4.01 |
| 2,765,392 | A | | 10/1956 | Park | |
| 2,798,785 | A | * | 7/1957 | Chesser | F24C 15/08 312/265.1 |
| 2,851,029 | A | | 9/1958 | Fry et al. | |
| 3,145,289 | A | | 8/1964 | Swetlitz | |
| 3,171,949 | A | | 3/1965 | McOrlly | |
| 3,612,829 | A | | 10/1971 | Evans et al. | |

(Continued)

FOREIGN PATENT DOCUMENTS

CN 205383660 U 7/2016
CN 106473589 A 3/2017
(Continued)

OTHER PUBLICATIONS

International Search Report and Written Opinion issued in Application No. PCT/CN2018/074174 dated Aug. 28, 2018.

Primary Examiner — Jorge A Pereiro
Assistant Examiner — Logan P Jones
(74) Attorney, Agent, or Firm — Middleton Reutlinger

(57) ABSTRACT

A method and apparatus for one or more service panels for a cooking appliance. The service panel may be removable to access one or more interior compartments of the frame structure or cooking appliance. The service panel may include a plurality of fasteners releasably engaging the frame or remaining portion of the cooking appliance. The service panel may provide access to a variety of electrical devices and/or mechanical devices within the interior compartment.

17 Claims, 5 Drawing Sheets

(56) References Cited

U.S. PATENT DOCUMENTS

| | | | | |
|---|---|---|---|---|
| 3,819,245 A | * | 6/1974 | Tacke | A47B 46/00 312/351.7 |
| 4,627,415 A | | 12/1986 | Kamo et al. | |
| 4,819,448 A | * | 4/1989 | Bardo | F24F 13/32 248/237 |
| 4,869,231 A | | 9/1989 | Rice et al. | |
| 4,890,638 A | * | 1/1990 | Davenport | E03B 7/095 137/377 |
| 5,287,799 A | | 2/1994 | Pickering et al. | |
| 5,549,098 A | | 8/1996 | Bales et al. | |
| 5,553,935 A | * | 9/1996 | Burnham | B67D 3/00 312/265.3 |
| 5,793,021 A | | 8/1998 | Walton | |
| 5,856,657 A | * | 1/1999 | Hoh | H01H 9/226 219/723 |
| 9,447,978 B2 | | 9/2016 | Ruperee | |
| 2002/0033390 A1 | * | 3/2002 | Von Mosshaim | F24C 15/30 219/452.11 |
| 2007/0246038 A1 | | 10/2007 | Raby et al. | |
| 2016/0290658 A1 | * | 10/2016 | Phillips | F24C 7/085 |
| 2017/0215636 A1 | * | 8/2017 | Shingler | A47J 36/08 |

FOREIGN PATENT DOCUMENTS

| | | | | |
|---|---|---|---|---|
| CN | 206284316 U | | 6/2017 | |
| CN | 206534513 U | | 10/2017 | |
| GB | 208759 A | | 12/1923 | |
| GB | 520256 A | * | 4/1940 | F24C 15/08 |

\* cited by examiner

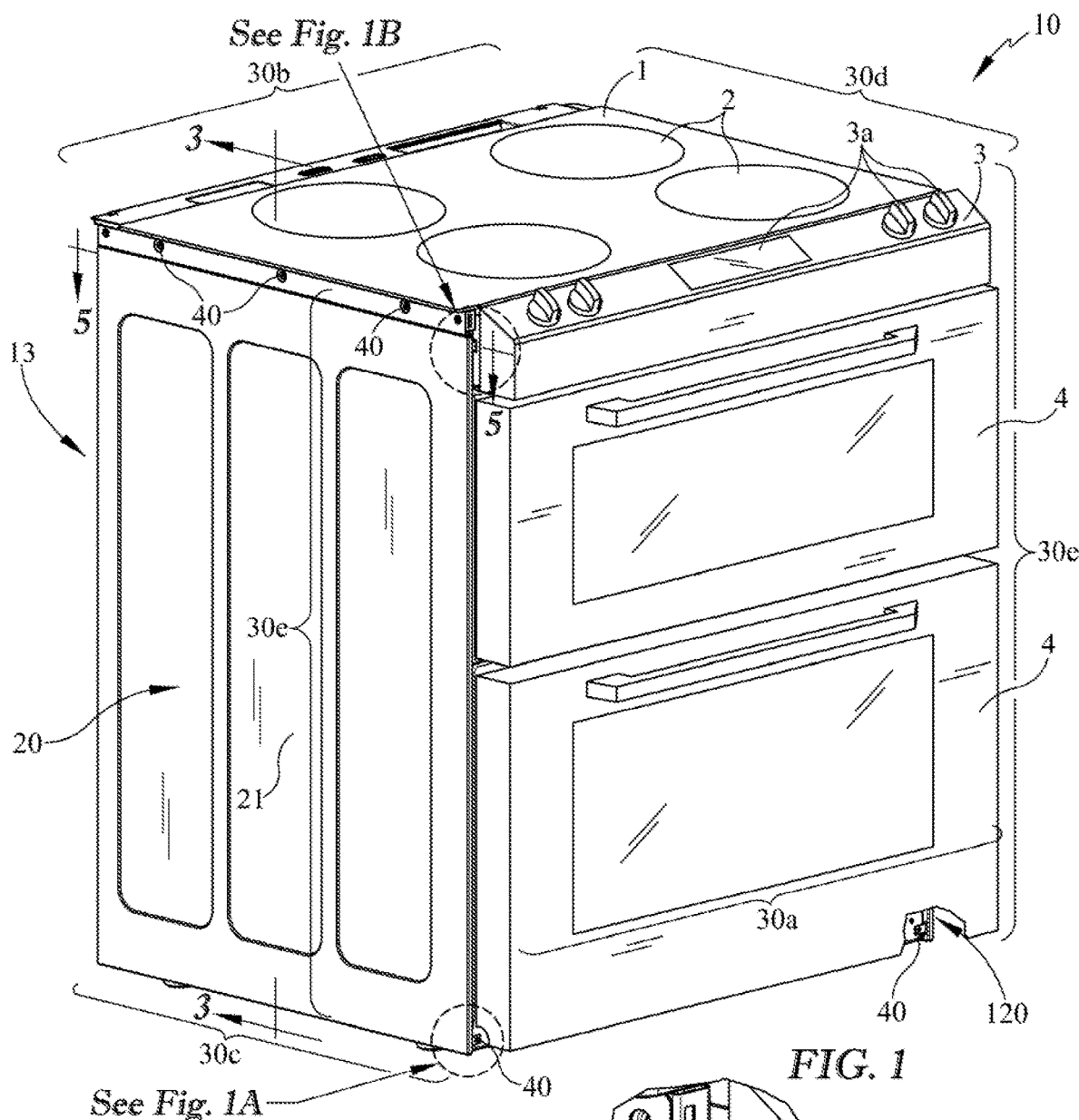
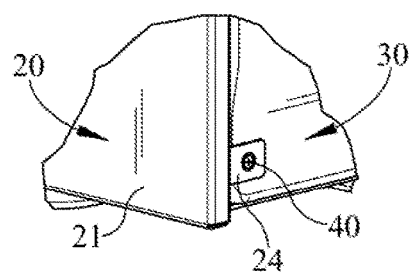
FIG. 1A
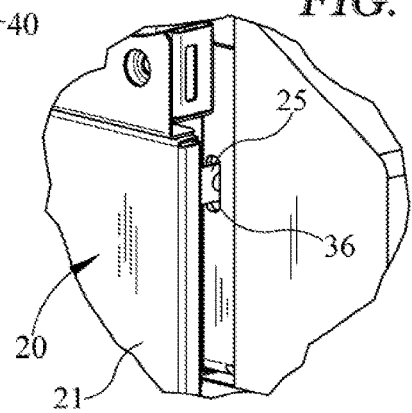
FIG. 1B
FIG. 1

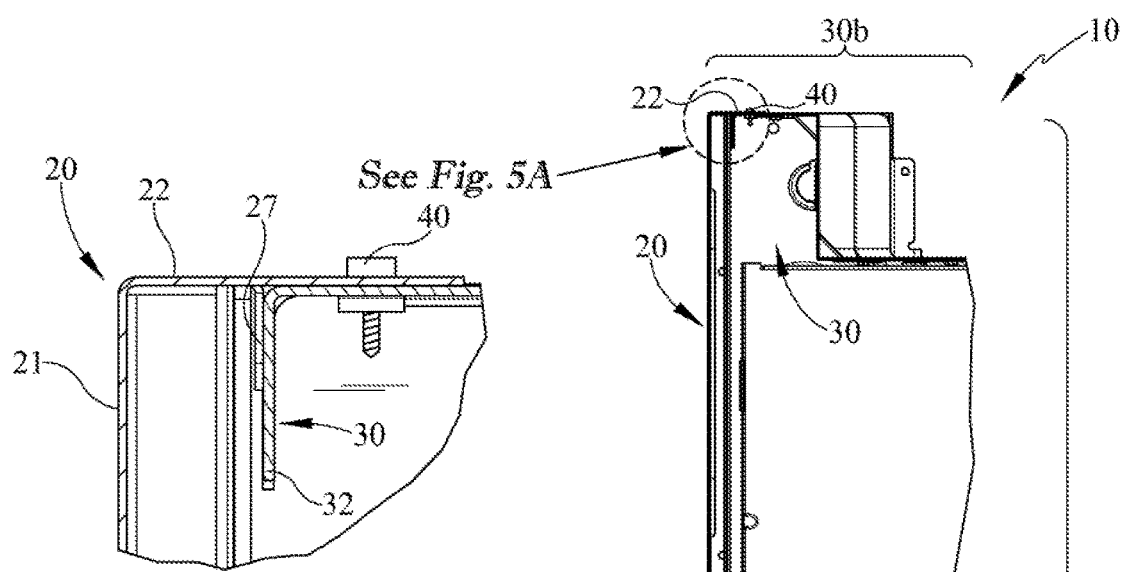
*FIG. 5A*
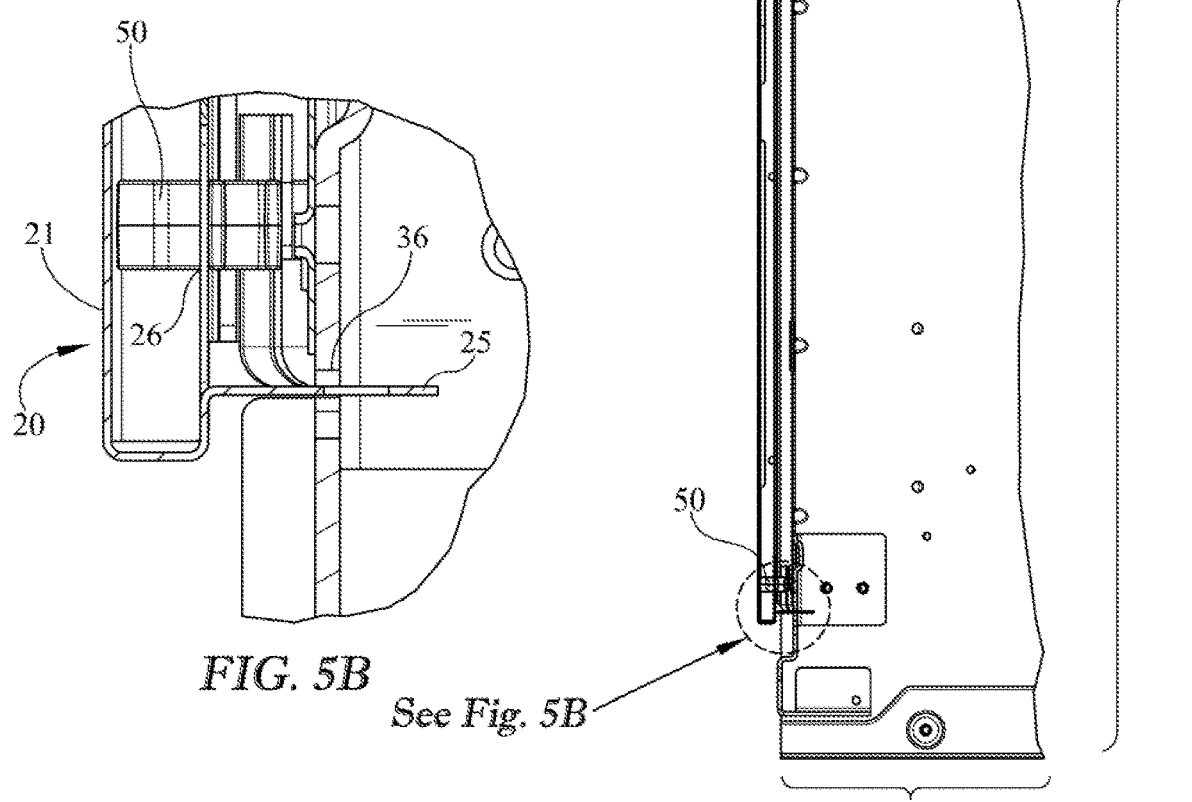
*FIG. 5B*
*FIG. 5*

SERVICE PANEL FOR A COOKING APPLIANCE

BACKGROUND

The present embodiments relate to a service panel integrated into an appliance, and particularly, but not limited to, for a gas and/or electric cooking appliance.

Typical cooking appliances involve complex procedures to disassemble and/or removal of the cooktop, top burners, manifold or control panels, gas and/or electrical connections, etc. to access the internal mechanical and/or electrical devices located within the peripheral sides of the appliance to service/replace. Thus, there is a need to allow a more convenient and simple method to service internal electrical and/or mechanical components of the cooking appliance without removal and/or disassembly of the cooktop, etc. and/or reduce disassembling complex parts of the cooktop range.

SUMMARY

In some embodiments, a cooking appliance may comprise a frame defining an interior compartment. In various embodiments, the cooking appliance may include a cooktop having one or more burners and may be supported by the frame. In some embodiments, the cooking appliance may include one or more cooking compartments supported within the interior compartment by the frame and may be accessible by one or more doors. In addition, in some embodiments, the cooking appliance may include one or more service panels supported by the frame and may be releasably secured to the frame. In various embodiments, removal of the one or more service panels may allow a user access into the interior compartment around at least the one or more cooking compartments without disassembly and/or removal of at least the cooktop.

In addition, in some embodiments, the frame may include at least a bottom side, a front side, a back side, and opposing lateral sides between the front side and the back side. In various embodiments, at least one of the one or more service panels may be disposed over one of the opposing lateral sides. In some embodiments, at least one service panel may be disposed over and outside a portion of the back side of the frame when the one or more service panels are secured to the frame. In various embodiments, the one or more service panels may extend between the bottom side of the frame and the cooktop. In some embodiments, the one or more service panels may extend between the front side of the frame to the back side of the frame. In addition, in various embodiments, the cooking appliance may include a plurality of fasteners securing the one or more service panels to the frame. In some embodiments, the plurality of fasteners may be removable outside the interior compartment when the one or more service panels are secured to the frame. In various embodiments, the cooking appliance may include one or more retention clips positioned between the one or more service panels and the frame. In various embodiments, the cooking appliance may include one or more electrical harnesses within the interior compartment and accessible when the one or more service panels are removed from the frame.

In some embodiments, the cooking appliance may comprise a frame having a bottom side, a top side, a front side, a back side, and opposing lateral sides defining an interior compartment. In various embodiments, the cooking appliance may include a cooktop having one or more burners and may be supported by the top side of the frame. In addition, in some embodiments, the cooking appliance may include one or more cooking compartments that may be supported within the interior compartment by the frame and may be accessible by one or more doors. In various embodiments, the cooking appliance may include a first service panel supported by the frame and may be releasably secured to the frame and may be disposed over one of the lateral sides of the frame. In addition, in some embodiments, the cooking appliance may include a second service panel that may be supported by the frame and may be releasably secured to the frame and may be disposed over the other one of the lateral sides of the frame. In various embodiments, removal of at least one of the first service panel and/or second service panel may allow a user access into the interior compartment around at least the one or more cooking compartments without disassembly and/or removal of at least the cooktop.

In addition, in some embodiments, each one of the first service panel and the second service panel may be disposed over the back side of the frame. In various embodiments, each one of the first service panel and the second service panel may include a rear flange transverse to a planar member, wherein the rear flange may be disposed over a portion of the back side of the frame when the first service panel and the second service panel is secured to the frame. In some embodiments, each one of the first service panel and the second service panel may include a projecting tab engaging the frame. In various embodiments, the cooking appliance may further comprise a plurality of fasteners securing at least one of the first service panel and the second service panel to the frame. In some embodiments, the plurality of fasteners may be removable from outside of the interior compartment when at least one of the first service panel and the second service panel is secured to the frame. In addition, in some embodiments, the cooking appliance may include one or more electrical harnesses within the interior compartment and may be accessible when at least one of the first service panel and the second service panel is removed from the frame. In various embodiments, the cooking appliance may comprise one or more plunger switches within the interior compartment and may be accessible when at least one of the first service panel and the second service panel is removed from the frame. In some embodiments, at least one of the first service panel and the second service panel may extend between the bottom side of the frame and the cooktop.

Further, in some embodiments, a method of accessing an interior compartment of a cooking appliance may comprise the step of providing a frame defining an interior compartment. In various embodiments, the method may include providing a cooktop having one or more burners supported and secured to the frame. In some embodiments, the method may include providing one or more cooking compartments supported within the interior compartment by the frame and accessible by one or more doors. In addition, in some embodiments, the method may include removing one or more service panels releasably secured to the frame while the cooktop is secured to the frame allowing a user access into the interior compartment around at least the one or more cooking compartments.

In addition, in some embodiments, the method may include removing a plurality of fasteners from the one or more service panels from outside the interior compartment. In various embodiments, the method may include accessing at least one of an electrical harness and a plunger switch when the one or more service panels are removed from the frame. In various embodiments, one or more service panels may extend from the cooktop to a bottom side of the frame.

In various embodiments, the method may include two of the one or more cooking compartments. In some embodiments, each one of the one or more service panels may include a rear flange transverse to a planar member, wherein the rear flange may be disposed over a portion of a back side of the frame and the planar member may be disposed over a corresponding lateral side of the frame when the one or more service panels are secured to the frame.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1 is a perspective view of one embodiment of a service panel of a cooking appliance;

FIGS. 1A and 1B are enlarged perspective views of the embodiment of FIG. 1;

FIG. 5 is a sectional view of the embodiment of FIG. 1 taken along line 5-5; and FIGS. 5A and 5B are enlarged perspective views of the embodiment of FIG. 5.

DETAILED DESCRIPTION

Figure 2:
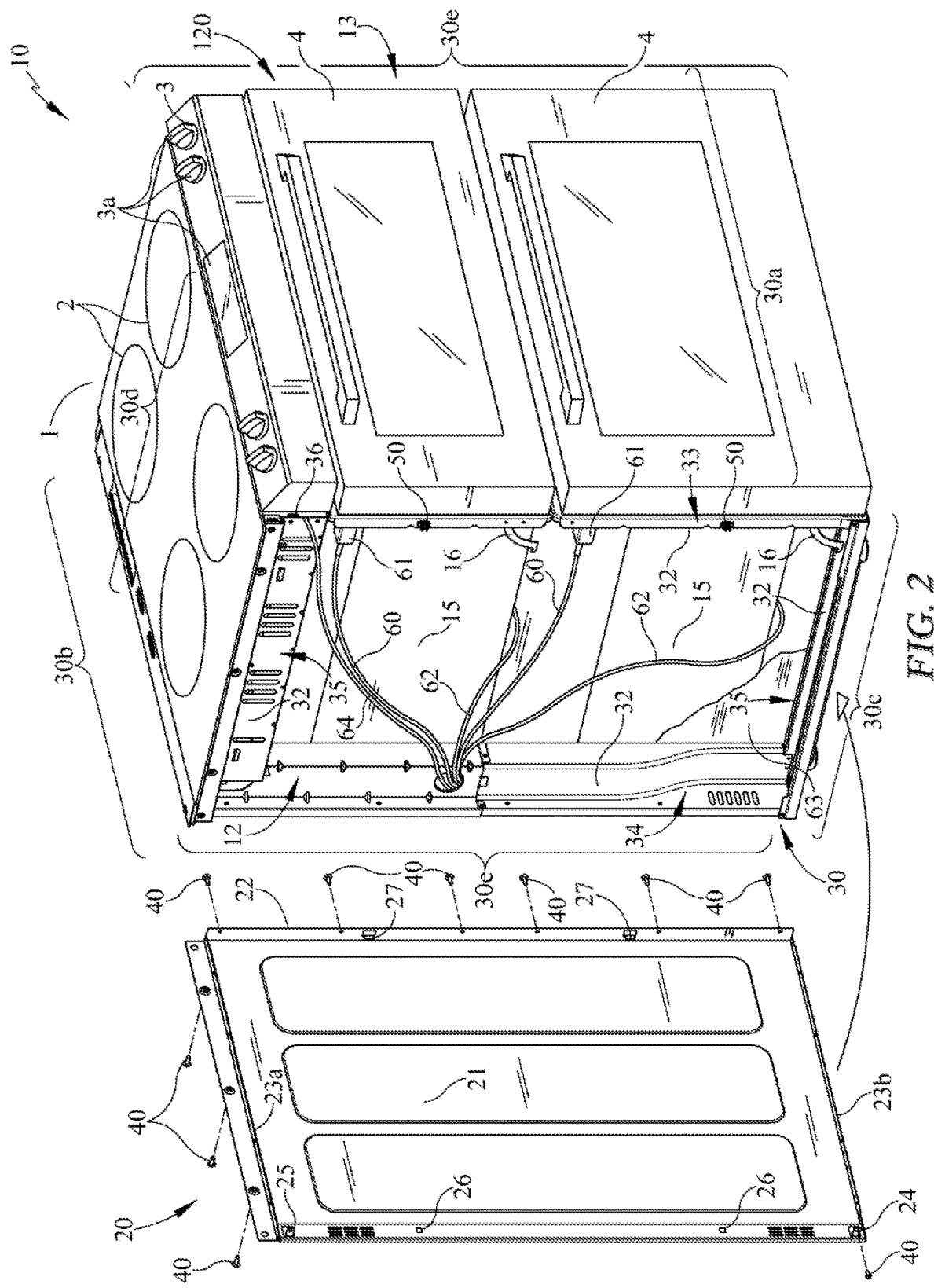
FIG. 2 is a perspective view of the embodiment of FIG. 1 with the service panel exploded away from the frame.

Numerous variations and modifications will be apparent to one of ordinary skill in the art, as will become apparent from the description below. Therefore, the invention is not limited to the specific implementations discussed herein.

As illustrated in the Figures, a service panel 20 may be used in a variety of cooking appliances 10 to access one or more interior compartments 12 within a frame 30 or support frame structure. With the service panel 20 not supporting or minimally carrying structural loads applied thereto as compared to the structural members 32 of the frame 30, the service panel 20 may be removed with minimal or no structural weakening/surrendering of the cooking appliance during servicing or internal access. In some embodiments, the service panel 20 may be removed or separated (e.g. fully as shown or remain partially connected) from the remaining portion of the cooking appliance 10 or frame 30 while reducing the disassembly and/or removal of one or more items such as, but not limited to, a cooktop 1, cooktop components, top burners 2, a manifold or control panel 3, gas and/or electrical connections, and/or doors 4, etc. The service panel 20 may be made of a variety of materials such as but is not limited to cold-rolled steel, stainless steel, pre-painted steel, etc. Moreover, each service panel 20 may be stamped or fabricated sheet metal. Although the cooking appliance 10 in the one embodiment shown includes a service panel 20, 120 on each side of the appliance 10 or lateral side of the frame, it should be understood that the cooking appliance 10 may include one service panel (e.g. on the left or right side). Moreover, the service panels 20, 120 do not have to be mirror images of each other and may be different in construction, shape, and/or sizes. Hereinafter for simplicity, only one or a first service panel 20 on the left or first lateral side of the cooking appliance will be discussed.

As shown in the FIG. 1, the service panel 20 may be used in a home oven or cooking appliance 10, such as but not limited to a slide-in cooking range, having a housing 13 and the cooking compartment 15, such as a baking oven, convection oven, steam oven, warming drawer and the like, in the housing 13 and accessible through a front door or drawer 4 in the front of the housing 13. In the cooking appliance 10 shown in FIG. 1, the housing 13 may have a two cooking compartments 15 and their corresponding frame structural members 32. However, some embodiments may have a single compartment 15. It should be understood that the one or more cooking compartments 15 and/or burners 2 may be heated by gas, electric, hybrid of gas and electric, or combination of heat sources thereof. One application of an embodiment of the cooking appliance may be for a general purpose kitchen oven. The front door 4 may at least partially define the cooking compartment opening into the cooking compartment 15 and be positionable between an opened position and a closed position (FIG. 1) relative to the remainder of the frame 30 and/or one or more of the walls or sides of the cooking compartment 15. The cooking appliance 10 may include a cooktop 1 on a top of the housing 13. The cooking appliance 10 may further include a control panel 3 having a plurality of control knobs or controls 3a for controlling the gas and/or electric burners, if a range used, and/or cooking compartment 15. In the embodiment shown, the front door 4 is hingedly connected, by one or more hinges 16, for opening to allow frontal access into the cooking compartment 15 through an opening. The embodiments discussed hereinafter will focus on the implementation of the hereinafter-described techniques and apparatuses within a residential cooking appliance such as cooking appliance 10, such as the type that may be used in single-family or multi-family dwellings, or in other similar applications.

It will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations. Implementation of the herein-described techniques within oven burners, broil burner, gas and/or electric range, slide-in oven, freestanding oven, gas and/or electric cooktop, gas countertop range, cooking appliances with front or rear controls, etc. using a service panel would be well within the abilities of one of ordinary skill in the art having the benefit of the instant disclosure, so the embodiments are not limited to the slide-in oven implementation discussed herein.

With the service panel 20 releasably secured to the frame 30, the removal may allow a user access into the one or more interior compartments 12 defined by the frame 30. The interior compartment 12 may be disposed about one or more cooking compartments 15 adjacent the lateral side of the cooking appliance. It is understood that the interior compartment 12 may be a variety of sizes, shapes, construction, locations, and quantities and still be within the scope of the teachings herein. In various embodiments, one or more frame structural members 32 may be used in the cooking appliance 10 to support the structural loads. As illustrated, the frame 30 may include a front side 30a, a back side 30b, bottom side 30c, a top side 30d, and opposing lateral sides 30e between the front side 30a and the back side 30b. The structural members 32 of the frame 30 may be a variety of configurations such as a front frame structure 33, back frame structure 34, and lateral extending structure 35 extending between the front frame structure 33 and the back frame structure 34. Each of the frame structural members may include a variety of shapes, sizes, and quantities of frame structural members 32 to define the one or more interior compartments 12 around the one or more cooking compartments 15, if used. The frame 30 may support at least the cooktop 1 with one or more burners 2, one or more cooking compartments 15, control panel 3, one or more doors 4, one or more service panels 20, etc.

Figure 4:
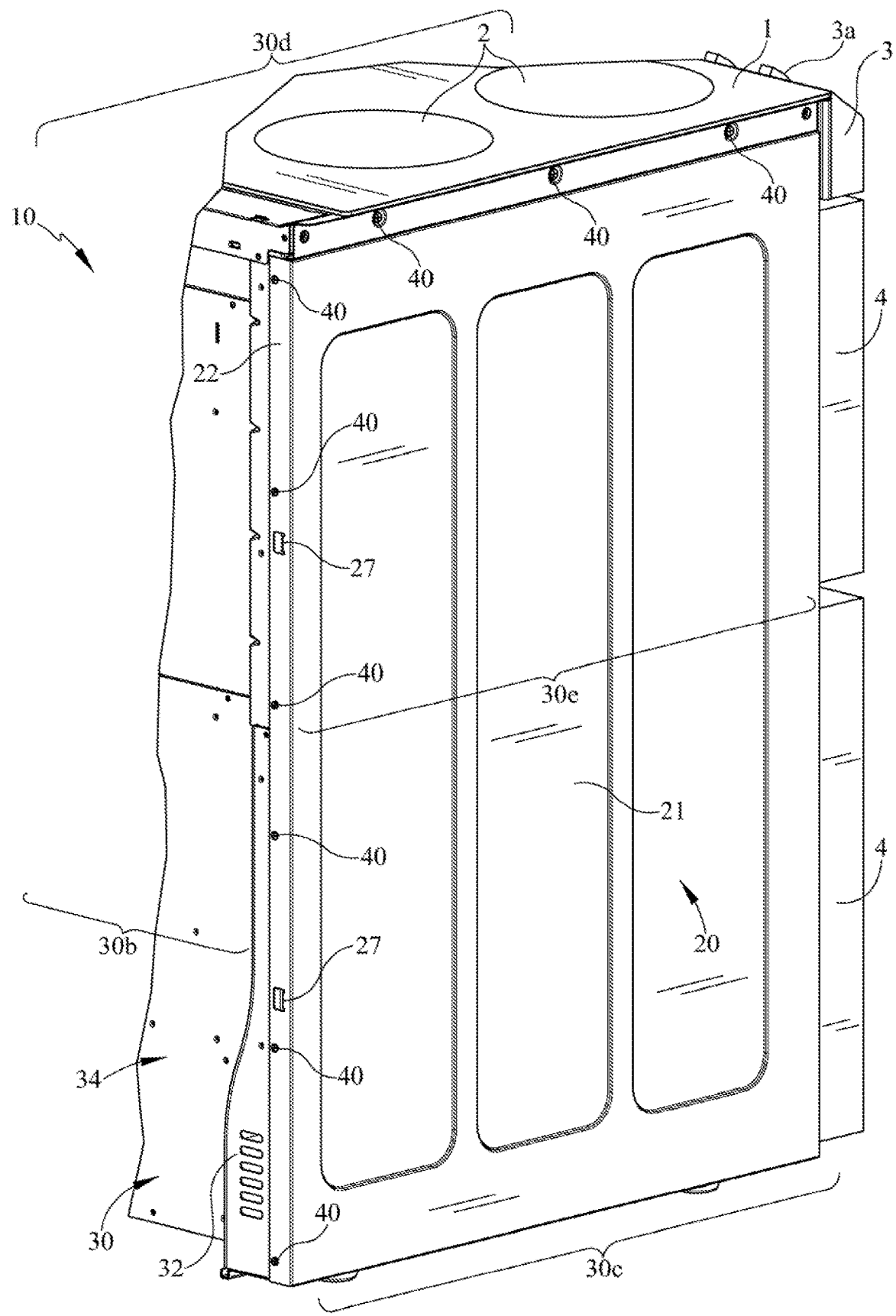
FIG. 4 is a rear perspective view of the embodiment of FIG. 2.

As illustrated in the Figures, the service panel 20 may be disposed over one or more sides of the frame 30 defining the interior compartment 12. In some embodiments, the service panel 20 may be disposed over at least a portion of the lateral side 30e. In various embodiments, the service panel 20 may be disposed over at least a portion of the back side 30b of the frame 30. As shown in the one embodiment in FIG. 4, the service panel 20 is disposed over the lateral side 30e and the back side 30b of the frame 30. The service panel 20 may include a substantially planar member 21 with a rear flange 22. The rear flange 22 may be orientated transverse to the planar member 21 adjacent the rear edge. The planar member 21 of the service panel 20 may be disposed over the lateral side 30e of the frame 30 and the rear flange 22 may be disposed over the back side 30b of the frame 30 when the service panel 20 is secured to the frame 30. The service panel 20 may extend from the cooktop 1 to the bottom side 30c of the frame 30. As is illustrated in FIGS. 1 and 4, the service panel 20 is disposed below the cooktop 1. In some embodiments, the service panel 20 extends from the front side 30a or doors 4 to the rear side 30b of the frame 30. Although the service panel 20 is shown as disposed substantially over the entire lateral side 30e of the cooking appliance, the service panel 20 may be a variety of shapes and sizes with corresponding coverage of the interior compartment. For example, the service panel 20 may be a top half or bottom half of the cooking appliance lateral side 30e. The service panel 20 may include one or more horizontal flanges in some embodiments. As illustrated, the service panel 20 may include a horizontal flange 23a adjacent the top edge. The top edge flange 23a may extend from the front edge to the rear edge of the service panel. If used, the horizontal flange 23a may align the service panel 20 with the frame 30, bottom of the structural member 32, or lateral extending structure 35. The service panel 20 may include a horizontal flange 23b adjacent the bottom edge in various embodiments. The bottom edge flange 23b may allow for alignment of the service panel relative to the frame 30. Moreover, the bottom edge flange 23b may be disposed over the bottom side 30c, lateral extending member 35, or frame 30. It is understood that the service panel 20 may be a variety of sizes, shapes, construction, quantities, and positions relative to the interior compartments/cooking appliance and still be within the scope of the teachings herein.

Figure 3A:
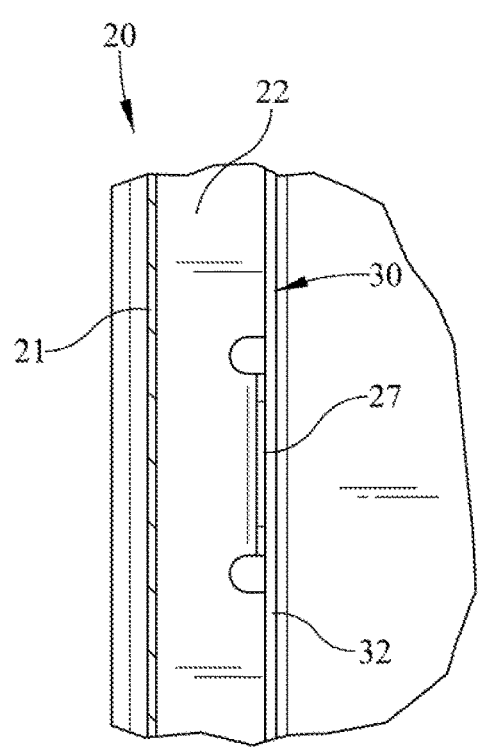
FIGS. 3A and 3B are enlarged perspective views of the embodiment of FIG. 3.
Figure 3B:
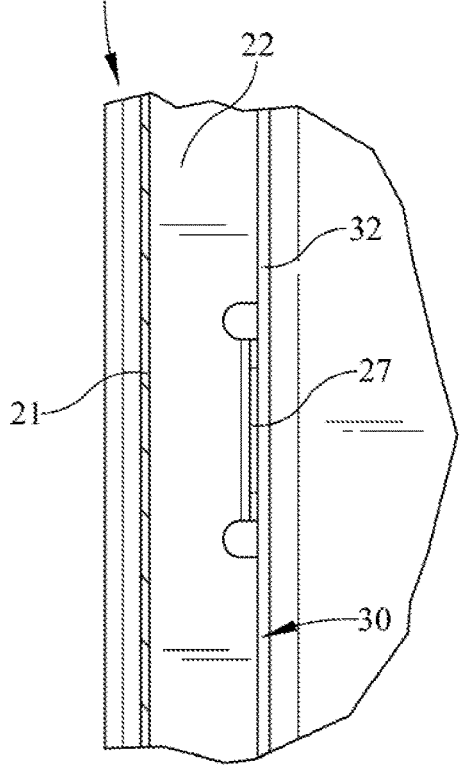
Figure 3:
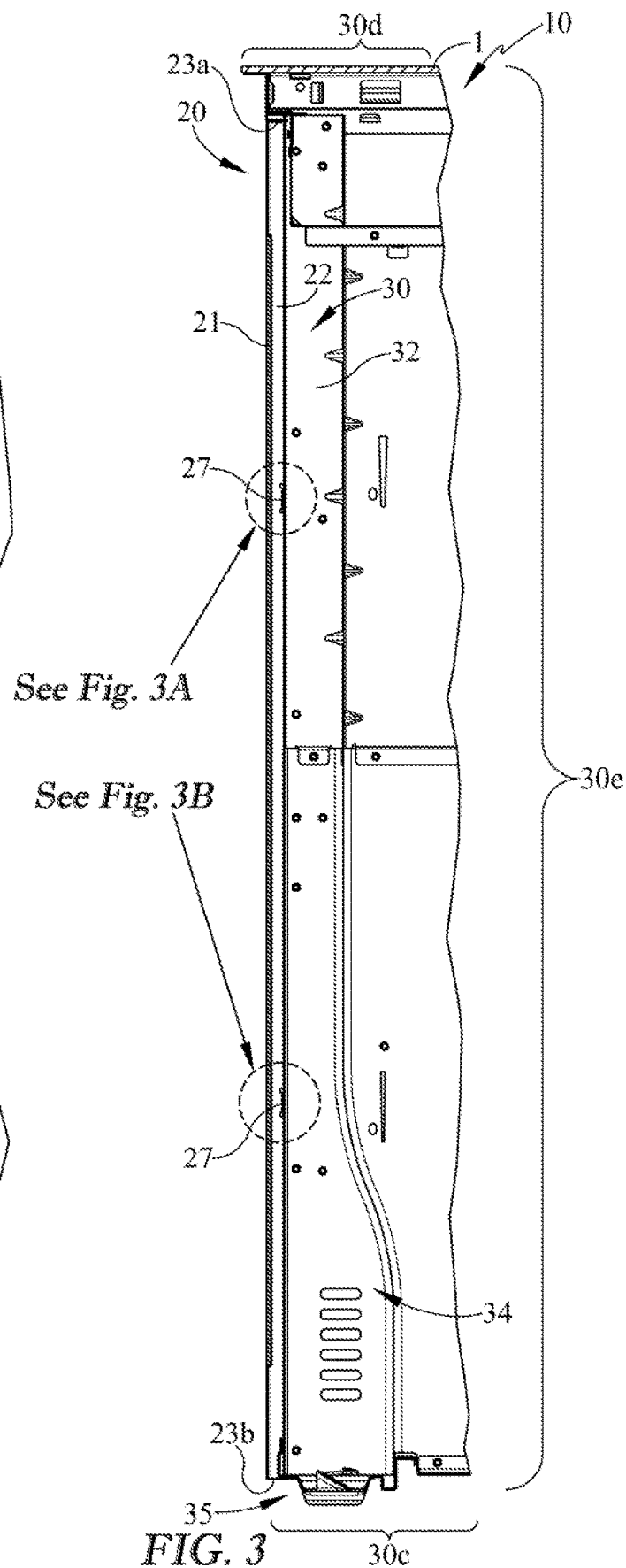
FIG. 3 is a sectional view of the embodiment FIG. 1 taken along line 3-3.

As shown in FIGS. 1 and 3, the service panel 20 may be releasably secured to the frame 30 or cooking appliance 10. In the one embodiment shown in FIGS. 1-4, the one or more fasteners 40 releasably secure the service panel 20 to the frame 30. The fasteners 40 may include but is not limited to a plurality of screws as shown. The fasteners 40 may releasably secure the service panel 20 to the frame 30 until there is desired access to the one or more interior compartment 12 (e.g. adjacent the cooking compartments 15 or side of the cooking appliance). As shown in FIG. 1, the fasteners 40 (e.g. screws) may be arranged at the top edge of the planar member 21 of the service panel 20 and/or along the rear flange 22 as shown in FIG. 4. The service panel may include one or more through openings or structure for receiving the fasteners 40. As shown in FIGS. 1, 1A, and 2, the service panel 20 may include a tab or portion 24 of the service panel positioned at the lower edge and/or front edge of the service panel 20. In some embodiments, the tab 24 may include an opening for receiving a fastener (e.g. screw) therethrough. The tab 24, if used, may be disposed across a portion of the front side 30a or frame structural member 32. The tab 24 and/or fastener 40 may be accessible in some embodiments, when the door 4 is open, closed, and/or removed. For example, the lower door 4 may need to be removed to access the fastener in the embodiment shown. However, in some embodiments the door 4 may remain attached to the appliance when removing one or more fasteners. The fasteners 40 are accessible and removable from outside of the interior compartment such that the user may not have to remove other components to access or a complicated procedure. One or more of the fasteners 40 may be visible on the exterior of the cooking appliance 10 or housing 13 (e.g. for ease of locating, accessibility, and/or identifying purposes). It is understood that in some embodiments, one or more fasteners may not be visible and/or need to be accessed internally. Moreover, special tools may be used in some embodiments to remove the fasteners or other components securing the service panel to the frame. As shown in FIGS. 1, 1B, 5, and 5B, the service panel 20 may include one or more tabs 25 to aid in alignment with the frame 30. As is shown more clearly in FIGS. 1B and 5B, the front edge of the service panel 20 may include the one or more tabs 25. The one or more tabs 25 may project from the planar member 21 and engage the frame 30. The tab 25 at the upper edge may be received by an opening 36 in the front frame structure 33 or frame 30.

In some embodiments, a variety of retention clips, retainers, and/or spacers may be used with the service panel 20 to releasable secure/space the service panel to the frame 30 or remaining cooking appliance 10. These spacers, retainers, and/or clips may maintain an even gap or alignment with the frame. As shown in FIGS. 2, 5, and 5B, one or more retention clips 50 may secure the service panel 20 to the frame 30. The retention clips 50 are shown along the front frame structure 33 to engage the front edge of the service panel 20 to the frame 30. The retention clips 50 releasable engage corresponding openings 26 within the service panel 20. The retention clips 50 may be of a variety of materials (e.g. plastic, metal, etc.). The retention clips 50 may be reusable. The clips may also aid in spacing the service panel relative to the frame. As shown FIG. 2, the retention clips 50 remain with the frame 30 when the service panel is removed therefrom. However, in some embodiments, the retention clips 50 and/or spacers, if used, may remain with the service panel 20 in some embodiments. The service panel 20 may include spacers that remain with the service panel. As shown in FIGS. 2, 3, 3A, 3B, 5, and 5A, the service panel 20 may include one or more spacers (e.g. tabs 27). As shown more clearly in FIGS. 3, 3A, and 5B, the rear flange 22 may include one or more flanges or tabs 27 inwardly projecting towards the frame 30. The tabs 27 abut the back frame structure 34 or frame 30 spacing the planar member 21 therefrom. It is understood that the retention clips, retainers, and/or spacers may be a variety of sizes, shapes, construction, quantities, and locations relative to the service panel and still be within the scope of the teachings herein.

A variety of electrical and/or mechanical devices may be accessed when the service panel is configured away (FIG. 2) from the secured position with the cooking appliance frame. The electrical and/or mechanical devices may be located within or accessed from the one or more internal compartments or sides of the appliance. As shown in FIG. 2, one or more electrical harnesses or components may be serviceable and/or replaced. For example, the electrical harnesses 60 to the one or more plunger switches 61 for the one or more cooking compartments 15, plunger switches 61, one or more baking electric elements and/or their harness 62, electrical connectors, sensors, controls, insulation 63, cooktop/burner components, burner harnesses 64, gas supply lines, pilots, one or more baking gas burners and/or their gas supply lines, one or more hinges 16 for the one or more doors 4, etc. may be accessible within the one or more internal compartments 12.

In use, the one or more service panels allow for access into the cooking appliance 10. The user is able to remove one or more of the service panels 20 from the frame by removing/disengaging one or more fasteners 40, retention clips 50, etc. In some embodiments, the cooktop need not be substantially disassembled and/or removed. The fasteners 40 may be removed from outside of the interior compartment 12 and/or exterior of the housing 13. The fasteners may be removed from one or more sides of the housing 13 or frame 30 (e.g. front side, back side, one or more lateral sides, etc.). In the one embodiment shown, the fasteners 40 are removed from the front side 30a, back side 30b, and the lateral side 30e of the frame 30. With the service panel in the removed or open configuration, the user may access the internal compartment to service and/or replace a variety of electrical and/or mechanical devices within the cooking appliance.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A cooking appliance comprising:
a frame defining an interior compartment, wherein the frame includes at least a bottom side, a front side, a back side, and opposing lateral sides between the front side and the back side;
a cooktop having one or more burners surrounded by an outer periphery and supported by the frame;
one or more cooking compartments supported within the interior compartment by the frame and accessible by one or more doors;
one or more service panels supported by the frame and releasably secured to the frame, wherein removal of the one or more service panels allows a user access into the interior compartment around at least the one or more cooking compartments without disassembly and/or removal of at least the cooktop;
wherein the one or more service panels include a planar member disposed over one of the opposing lateral sides, a top edge flange projecting from the planar member adjacent a top edge of the planar member to align the service panel with the frame, a bottom flange projecting from the planar member adjacent a bottom edge of the planar member to engage the bottom side of the frame when the one or more service panels are secured to the frame, and a rear flange projecting from the planar member disposed over and outside a portion of the back side of the frame when the one or more service panels are secured to the frame, wherein the planar member includes the top edge accessible at a lower elevation than the outer periphery of the cooktop when assembled, wherein one or more fasteners are positioned above the top edge flange adjacent the top edge of the planar member at the lower elevation below the outer periphery of the cooktop to secure the one or more service panels to the frame, and wherein the one or more fasteners are removable outside the interior compartment when the one or more service panels are secured to the frame without disassembly and/or removal of at least the cooktop; and
one or more retention clips positioned between the planar member of the one or more service panels and the lateral side of the frame, and wherein the one or more retention clips project from the lateral side of the frame adjacent the front side of the frame and releasably engage one or more openings within the planar member adjacent a front edge of the one or more service panels.

2. The cooking appliance of claim 1 wherein the bottom edge flange is disposed over and outside a portion of the bottom side of the frame when the one or more service panels are secured to the frame.

3. The cooking appliance of claim 1 wherein the planar member of the one or more service panels extends between the bottom side of the frame and the cooktop.

4. The cooking appliance of claim 3 wherein the planar member of the one or more service panels extends between the front side of the frame to the back side of the frame.

5. The cooking appliance of claim 1 further comprising one or more second fasteners securing the rear flange of the one or more service panels to the back side of the frame, wherein the one or more second fasteners are removable outside the interior compartment when the one or more service panels are secured to the frame.

6. The cooking appliance of claim 1 further comprising one or more electrical harnesses within the interior compartment and accessible when the one or more service panels are removed from the frame.

7. A cooking appliance comprising:
a frame having a bottom side, a top side, a front side, a back side, and opposing lateral sides defining an interior compartment, wherein the frame includes a lateral extending member adjacent each one of the bottom side and the top side;
a cooktop having one or more burners and supported by the top side of the frame; one or more cooking compartments supported within the interior compartment by the frame and accessible by one or more doors; and
a first service panel supported by the frame and is releasably secured to the frame and disposed over one of the lateral sides of the frame and a second service panel supported by the frame and is releasably secured to the frame and disposed over the other one of the lateral sides of the frame, wherein removal of at least one of the first service panel and second service panel allows a user access into the interior compartment around at least the one or more cooking compartments without disassembly and/or removal of at least the cooktop;
wherein each one of the first service panel and the second service panel includes a rear flange transverse to a planar member to define an L-shaped cross section in a horizontal plane, wherein the planar member is disposed over the lateral side of the frame and the rear flange is disposed over a portion of the back side of the frame when the first service panel and the second service panel is secured to the frame;
wherein each one of the first service panel and the second service panel includes a top edge flange and a bottom edge flange projecting horizontally from the planar member towards the frame and engaging the lateral extending member of the frame adjacent the top side and the bottom side, respectively, and wherein the top edge flange is spaced downwardly away from a top edge of the planar member; and one or more retention clips positioned between the planar member of each one of the first service panel and the second service panel and the lateral side of the frame, and wherein the one or more retention clips project from the lateral side of the frame adjacent the front side of the frame and releasably engage one or more openings within the planar member adjacent a front edge of each one of the first service panel and the second service panel.

8. The cooking appliance of claim 7 wherein each one of the first service panel and the second service panel includes a projecting tab adjacent the front edge of each one of the first service panel and the second service panel releasably engaging an opening in the lateral side of the frame adjacent the front side of the frame.

9. The cooking appliance of claim 7 further comprising a plurality of fasteners securing at least one of the first service panel and the second service panel to the frame, wherein the plurality of fasteners are removable from outside of the interior compartment when at least one of the first service panel and the second service panel is secured to the frame, and wherein one or more fasteners of the plurality of fasteners are positioned above the top edge flange in the top edge of the planar member.

10. The cooking appliance of claim 7 further comprising one or more electrical harnesses within the interior compartment and accessible when at least one of the first service panel and the second service panel is removed from the frame.

11. The cooking appliance of claim 10 further comprising one or more plunger switches within the interior compartment and accessible when at least one of the first service panel and the second service panel is removed from the frame.

12. The cooking appliance of claim 7 wherein at least one of the first service panel and the second service panel extend between the bottom side of the frame and the cooktop.

13. A method of accessing an interior compartment of a cooking appliance comprising the steps of:
providing a frame defining an interior compartment;
providing a cooktop having one or more burners supported and secured to the frame, and wherein the cooktop includes an outer peripheral edge;
providing one or more cooking compartments supported within the interior compartment by the frame and accessible by one or more doors;
removing one or more service panels releasably secured to the frame while the cooktop is secured in an operating position to the frame allowing a user access into the interior compartment around at least the one or more cooking compartments, wherein the one or more service panels include a planar member having a top edge flange and a bottom edge extending horizontally from a front edge to a rear edge of the service panel;
removing a plurality of fasteners from the one or more service panels from outside the interior compartment, wherein one or more fasteners of the plurality of fasteners are positioned within the planar member that is disposed over a corresponding lateral side of the frame when the one or more service panels are secured to the frame, and wherein the one or more fasteners within the planar member are positioned above the top edge flange and below the lowermost extent of the outer peripheral edge of the cooktop while the cooktop is secured in the operating position to the frame allowing a user access to the one or more fasteners of the planar member;
releasing both the top edge flange from a first lateral extending member of the frame adjacent a top side of the frame and the bottom edge flange from a second lateral extending member of the frame adjacent a bottom side of the frame;
releasing one or more retention clips projecting from a front frame structure of the frame from one or more openings within the planar member of the one or more service panels; and
releasing one or more tabs projecting from the planar member of the one or more service panels from one or more openings of the front frame structure of the frame.

14. The method of claim 13 further comprising a step of accessing at least one of an electrical harness and a plunger switch when the one or more service panels are removed from the frame.

15. The method of claim 13 wherein the one or more service panels extend from the cooktop to a bottom side of the frame.

16. The method of claim 13 further comprising two of the one or more cooking compartments.

17. The method of claim 13 wherein each one of the one or more service panels includes a rear flange transverse to the planar member to define an L-shaped cross section in a horizontal plane, wherein the planar member is disposed over a lateral side of the frame and the rear flange is disposed over a portion of a back side of the frame when the one or more service panels are secured to the frame.

* * * * *